United States Patent
Rudd (10) Patent No.: US 6,571,672 B1
(45) Date of Patent: Jun. 3, 2003

(54) METHOD AND APPARATUS FOR MANUFACTURING AN EXPANDABLE SLOTTED TUBE

(75) Inventor: Wayne Rudd, Aberdeen (GB)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 09/554,677
(22) PCT Filed: Nov. 19, 1998
(86) PCT No.: PCT/GB98/03478
§ 371 (c)(1),
(2), (4) Date: May 17, 2000
(87) PCT Pub. No.: WO99/25524
PCT Pub. Date: May 27, 1999

(30) Foreign Application Priority Data

Nov. 19, 1997 (GB) .............................. 9724335

(51) Int. Cl.⁷ .................................. B26D 1/14
(52) U.S. Cl. ................ 83/36; 83/54; 83/74; 83/350
(58) Field of Search .................. 83/54, 74, 36, 83/267, 350

(56) References Cited

U.S. PATENT DOCUMENTS

| | | | |
|---|---|---|---|
| 1,731,930 A | * 10/1929 | McCullough | |
| 1,760,075 A | * 5/1930 | McCullough et al. | |
| 3,545,336 A | * 12/1970 | Savko | |
| 4,358,978 A | * 11/1982 | Lawson | .................. 83/364 |

FOREIGN PATENT DOCUMENTS

| | | | |
|---|---|---|---|
| DE | 32 13 464 | * 10/1983 | |
| DE | 3213464 A1 | 10/1983 | ............ B23D/45/12 |
| WO | WO 93/25800 | 12/1993 | ............ E21B/43/10 |
| WO | WO 97/21901 | 6/1997 | ............ E21B/17/08 |
| WO | PCT WO 97/28920 | * 8/1997 | |
| WO | WO 99/18328 | 4/1999 | ............ E21B/23/01 |
| WO | WO 99/23354 | 5/1999 | ............ E21B/43/10 |

OTHER PUBLICATIONS

U.S. patent application Ser. No. 09/530301, filed Nov. 2, 1998.

* cited by examiner

Primary Examiner—Kenneth E. Peterson
(74) Attorney, Agent, or Firm—Moser, Patterson & Sheridan, L.L.P.

(57) ABSTRACT

A method of manufacturing an expandable slotted tube (10) fabricated from at least one tubular element (12, 14) and at least two annular elements (11, 13, 15) connected to the opposite ends of the tubular element by way of butt joints wherein axially extending slots are formed at a uniform angular spacing around the periphery of the tube and in longitudinally overlapping relation characterized by cutting said annular elements (11, 13, 15) in a pattern of overlapping positionally fixed slots (27, 28, 29, 46, 37, 38, 39) in accordance with invariable parameters which are predetermined relative to the dimensions of said annular elements (11, 13, 15) and cutting in said tubular element a pattern of slots (30, 45, 47, 40) that is variable in accordance with measured parameters of the tube so as to achieve the required overlap between said positionally fixed and variable slots. A machine for carrying out the method is also described.

2 Claims, 6 Drawing Sheets

METHOD AND APPARATUS FOR MANUFACTURING AN EXPANDABLE SLOTTED TUBE

DESCRIPTION OF INVENTION

This invention relates to expandable slotted tube which is used primarily in bore holes to form a lining which prevents collapse of the wall of the bore hole whilst allowing substantially unrestricted flow of fluids from the surrounding strata into the bore hole.

The use of such expandable slotted tube is described particularly in WO-A-93/25800. The expandable slotted tube (or "liner" as as it is referred to therein) is a product which can with advantage be used in all aspects of well life, including drilling, completion, well intervention and abandonment. Conventional oil field technology is based on inserting articles of fixed size into the well bore, and well construction is normally such that the size of the bore progressively reduces from the well head down to the reservoir to be tapped. This can lead to an unworkably small bore size at the required depth, leading to compromises in well operability or, in an extreme case, resulting in failure to reach the reservoir at a bore size sufficient to enable the reserves to be exploited.

The use of expandable slotted tube provides flexibility to cope with unexpected problems during both drilling and completion of the well and also during the life of the well as compared with conventional well construction techniques.

In particular, expandable slotted tube can be designed to fit most well bore sizes, whilst being made small enough to pass through pre-existing restrictions in the bore. This is largely as a result of the phenomenon known as "surplus expansion" which occurs when the expandable slotted tube is expanded by drawing an expansion mandrel through it, that is to say the expanded internal diameter of the tube increases to a value greater than that of the maximum outside diameter of the expansion mandrel by a factor which is dependent at least in part on the mandrel design.

The expandable slotted tube as described in WO-A-93/25800 can be expanded up to 200% of its original diameter and can in theory be made in any size or length.

However, there are problems in the manufacture of such expandable slotted tube, and in particular in ensuring uniform radial expansion.

In practice, the tube in which the slots have to be formed will, in general, not be accurately cylindrical and straight over the whole of its length. The longitudinal axis of the tube may deviate from a straight line over all or part of its length, and the circumferential shape of the tube may deviate from accurately circular over part or all of its length, due to limitations inherent in the manufacturing processes conventionally employed. As a result, if a pre-determined and invariable pattern of slots is cut into such a tube such defects will be magnified by its subsequent radial expansion and may then exceed acceptable tolerances.

Moreover, in practice, such tubes must be joined together to form a liner of the required overall working length corresponding to the depth of the borehole. Accordingly, appropriate coupling fittings must be provided at opposite ends of each tube to form a composite fabrication comprising a tubular element of appropriate length and annular elements forming the coupling fittings at the ends thereof. Further, each length of such fabricated tube may include one or more additional fittings intermediate its ends, known as "landing rings", which are also formed as separate components, the tube then comprising two (or more) of said tubular elements connected together in end-wise relation by an annular element formed as a landing ring, and the two annular elements forming the end coupling fittings.

Thus, typically, a length of tube as fabricated may comprise at least five elements, namely a female end coupling at one end, a first tubular element, a landing ring, a second tubular element, and a male end coupling at the other end. The couplings and landing ring are fittings that are normally formed to a high degree of accuracy by machining operations, and these fittings necessarily have different characteristics from the tubular elements. However, the individual components are secured together in endwise relation by means such as welding, and the fabrication of the complete tube in this way inevitably introduces variability in a number of respects from one tube to another, even though nominally identical.

In particular, the overall length of the fabricated tube, which is typically in excess of 10 meters, may vary by several millimeters as a result of the accumulated tolerances on the lengths of the individual tubular elements and the thickness of each weld. Additionally, as a result of potential distortions within each tubular element, the couplings at opposite ends of the tube will in general not be accurately in register with one another circumferentially, that is to say one may be angularly offset relative to the other about the centreline of the tube. This is of significance since the couplings are normally formed with axially interfitting formations, and the slots which are formed in the tube must be correctly orientated relative to such interfitting formations at both ends of the tube.

Additionally, the accuracy, with respect to location and length, of the slots which extend across locally thickened portions of the tube, for example in the landing rings and end couplings, is critical.

Accordingly the object of the invention is to facilitate the manufacture of expanded slotted tube in a manner which satisfactorily takes such factors into account.

According to the invention we provide a method of manufacturing an expandable slotted tube of a kind which is fabricated from at least one tubular element formed by extrusion or similar processes and at least two annular elements formed by machining or like processes and connected to the opposite ends of the tubular element by means of butt joints formed by welding or like processes, wherein axially extending slots are formed at a uniform angular spacing around the periphery of the tube fabricated from said elements and in longitudinally overlapping relation throughout the entire length of said fabricated tube, including said tubular element and said annular elements, the method being characterised by cutting in said annular elements a pattern of overlapping positionally fixed slots in accordance with fixed and invariable parameters with regard to their longitudinal position and length which are pre-determined relative to the dimensions of said annular elements, and cutting in said tubular element a pattern of positionally variable slots that is variable with regard to at least the parameters of longitudinal position and length of the slots in accordance with measured parameters of the fabricated tube so as to achieve the required overlap between said positionally fixed slots and said positionally variable slots.

The method may include the steps of a) establishing longitudinal datum points for each of said annular elements, b) calculating, by reference to said longitudinal datum points and by reference to the pre-determined parameters of longitudinal position and axial length of said positionally fixed slots, the nominal longitudinal position and axial length of said positionally variable slots required to be cut in said tubular element so as to ensure that those positionally variable slots that extend across a joint between said annular elements and said tubular element are longitudinally centred on the joint across which they extend, and the length of each overlap between said positionally variable slots, including said joint-crossing slots, is uniform, and c) cutting said slots in accordance with said pre-determined and said calculated parameters.

The method also preferably includes the further step of monitoring at the cutting site the position of the local centre-line of the tube and the radial distance from said centre-line to the outer surface of the tube, and recalculating the nominal parameters of the positionally variable slots so as to correct substantially uniformly over the length of the tubular element for any local deviations in the position of the centre-line and/or in circularity of the tubular element.

The method is preferably carried out by commencing the cutting of said slots from one end of the fabricated tube to form said slots progressively along the entire length of the tube.

The longitudinal datum points may include a first point corresponding to a first end of the tube as defined by an end face of the annular element at that end of the tube and a second point corresponding to the other end of the tube as defined by an end face of the annular element at that end of the tube, plus third and fourth points corresponding respectively to the joints between the tubular element and the annular elements at those ends of the tube. It will be appreciated that the annular elements at those ends of the tube may comprise couplings for the releasable connection of two similar tubes, in particular male and female couplings which are adapted to fit at least partially one inside the other and accordingly are in part of greater external diameter than the tubular element to which they are joined.

Normally, the fabricated tube will also include a further such annular element which is disposed intermediate the ends of the tube, which then comprises two of said tubular elements, such intermediate annular element being connected thereto by butt joints. Such intermediate annular element may be formed with an external flange for the purpose of lifting the fabricated tube, and therefore also be of greater external diameter than the tubular element to which it is joined. In such a case the datum point for this intermediate annular element may be afforded by a radial face of the flange. The method previously described may accordingly be applied to the manufacture of slotted tube of the kind which the tubular element has a further tubular element connected thereto by means of one of said annular elements and said further tubular element has a further annular element connected at the end thereof, and the annular element which is disposed intermediate the tubular elements is formed with an external flange, by establishing a further datum point corresponding to a radial face of the flange on said intermediate annular element.

In accordance with a preferred feature of the invention an angular datum is also established relative to the centre-line of the fabricated tube at one end thereof, and cutting is commenced at the other end so that any angular off-set which is required at the latter end to align the slots correctly with respect to the annular element at that end is determined relative to said angular datum and is included in the re-calculation of the parameters of said positionally variable slots. The angular position of the positionally fixed slots may also be included in this re-calculation.

According to a further aspect the invention also resides in expandable slotted tube as manufactured by the above method.

Further, the invention also resides in a machine for use in the manufacture by the above method of expandable slotted tube of a kind which is fabricated from at least one tubular element formed by extrusion or similar processes and at least two annular elements formed by machining or like processes and connected to the opposite ends of the tubular element by means of butt joints formed by welding or like processes, wherein axially extending slots are formed at a uniform angular spacing around the periphery of the tube fabricated from said elements and in longitudinally overlapping relation throughout the entire length thereof, including said tubular element and said annular elements, and comprising a) means for establishing longitudinal datum points for each of said annular elements, b) means for calculating, by reference to said longitudinal datum points and to the pre-determined parameters of longitudinal position and axial length of said positionally fixed slots, the nominal longitudinal position and axial length of said positionally variable slots required to be cut in said tubular element so as to ensure that those positionally variable slots (hereinafter called "joint-crossing" slots) that extend across a joint between said annular elements and said tubular element are longitudinally centred on the joint across which they extend, and the length of each overlap between said positionally variable slots, including said joint-crossing slots, is uniform, and c) means for cutting said slots in accordance with said pre-determined and calculated parameters.

The cutting means is preferably arranged to cut said slots progressively from one end of the fabricated tube to form said slots sequentially along the entire length of the tube.

The machine also preferably includes means for monitoring the position of the local centre-line of the tube and the radial distance of the outer surface of the tube at the cutting site from said centre-line, and recalculating the nominal parameters of the positionally variable slots so as to correct substantially uniformly over the length of the tubular element for any local deviations in the position of the centre-line and/or in circularity of the tubular element as the cutting progresses along the tubular element.

Such machine preferably also includes means for establishing an angular datum relative to the centre-line of the fabricated tube at one end thereof, means for providing an angular off-set relative to said angular datum of said cutting means at the other end of the tube to align the slots correctly with respect to the annular element at that end, and means for including said angular off-set in the re-calculation of the parameters of said positionally variable slots as cutting progresses.

The machine may comprise a plurality of supports adapted to hold a fabricated tube for cutting, an indexing rotator connectable to said tube for rotating said tube about its longitudinal axis in step-wise increments, a longitudinal guide defining a first longitudinal axis parallel to that of said tube when mounted on said supports, a main carriage mounted on said longitudinal guide for movement along said first longitudinal axis and along the entire length of said tube, a sub-carriage mounted on said main carriage for movement relative thereto on two transverse axes relative to said longitudinal axis of the tube so that said sub-carriage can thereby be centred relative to said longitudinal axis of the tube and for movement on a second longitudinal axis which is parallel to said first longitudinal axis, at least one slot cutter mounted on said sub-carriage for movement radially relative to said longitudinal axis of the tube, and a control system operative to move said main carriage through a succession of working positions along the longitudinal guide, in each of which positions the sub-carriage is centred relative to said longitudinal axis of the tube and a sequence of slot cutting operations is performed by moving said sub-carriage along said second longitudinal axis while said slot cutter is operated to cut a slot of pre-determined length, rotationally indexing said tube and returning said sub-carriage to its starting position on said second longitudinal axis and repeating the cutting operations until all the required slots are formed at each of said working positions.

Preferably, the machine includes a plurality, e.g. four, of said slot cutters which are arranged at equal spacings around longitudinal axis of the tube so that a plurality of slots can be cut simultaneously each time the tube is indexed. The slot cutters are preferably abrasive water-jet cutters, although other types of cutter could be employed.

These and other aspects of the invention will now be described by way of example with reference to the accompanying drawings wherein.

Figure 1:
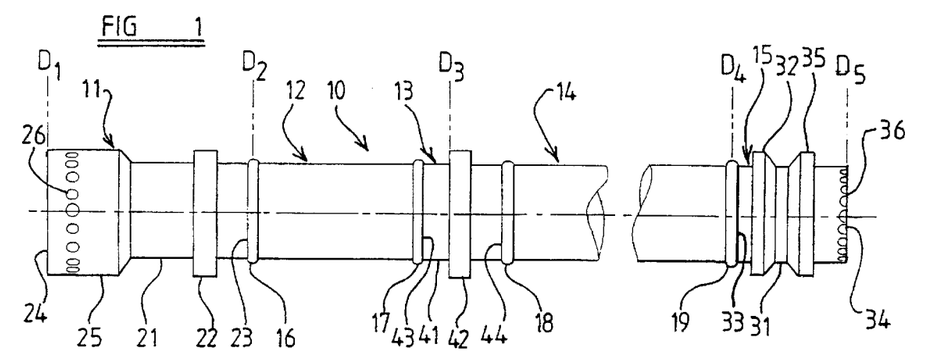
FIG. 1 is a diagrammatic illustration of a typical fabricated tube prior to slotting.

As shown in FIG. 1, a fabricated tube 10 of the kind to which the present invention is applied comprises an end fitting 11 serving as a female coupling, a shelter tubular element 12, a landing ring 13, a longer tubular element 14, and a further end fitting 15 serving as a male coupling. The end fittings 11 and 15, and the landing ring 13, are each formed as machined components of accurately determined length, diameter and circularity etc., but the tubular elements 12 and 14 are conventionally formed by extrusion and generally will not be truly straight throughout their lengths, and may not be truly cylindrical in shape at all points along their lengths, and indeed the tolerance on wall thickness and outside diameter may be significantly greater than that which is applicable to the machined components. The five components are secured together endwise by butt welding to form joints as shown at 16,17,18 and 19, and the thickness of each butt weld is somewhat variable with the result that the overall length of the tube 10 as fabricated may vary from the nominal value by several millimeters, in a total length which in many cases will exceed 10 meters. Typically, the outside diameter of the tubular elements may be between approximately 10 and 40 cm.

Figure 3:
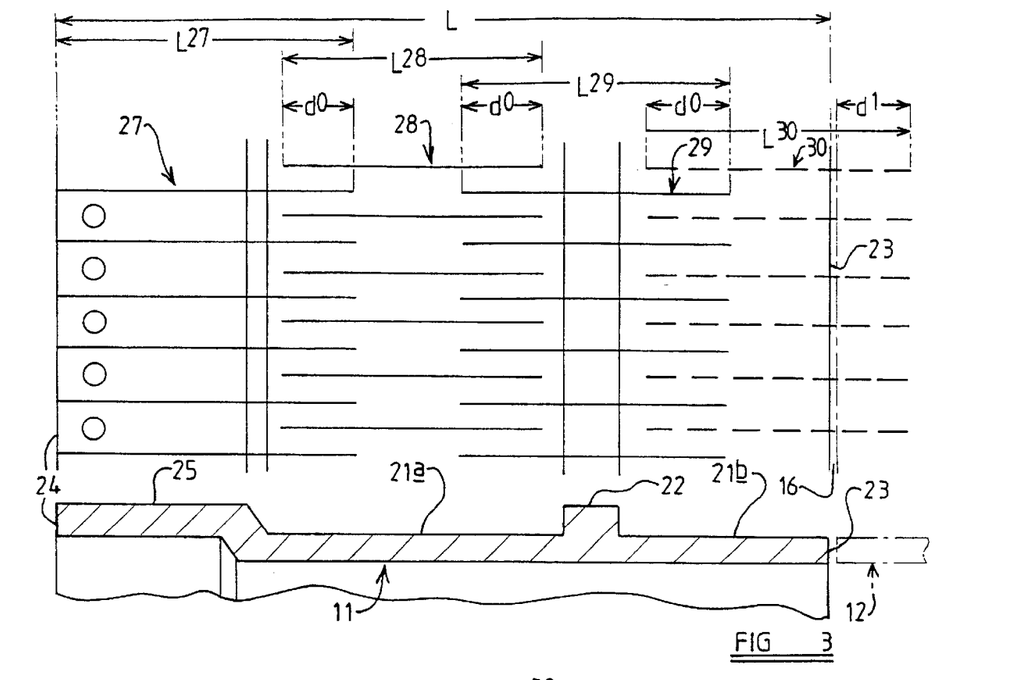
FIG. 3 illustrates diagrammatically a section through a female connector at one end of the fabricated tube and a developed view of the slot pattern which requires to be cut.

The female coupling 11 includes a body portion 21 of the same nominal diameter and wall thickness as the adjacent tubular element 12, with an external flange 22 near the end 23 at which it is welded to tubular element 12. The flange 22 divides the body portion 21 into outer and inner sections 21a and 21b respectively. At the opposite end 24 the female coupling 11 is formed with a widened end portion 25 which is formed with internal circumferentially extending serrations (not shown) and with a plurality of circumferentially spaced notes 26 which are adapted to receive locking plungers (not shown) for the purpose of locking in place the complementary male coupling 15 which is provided at the other end of a similar tube to which the tube 10 will, in use, be connected.

Figure 4:
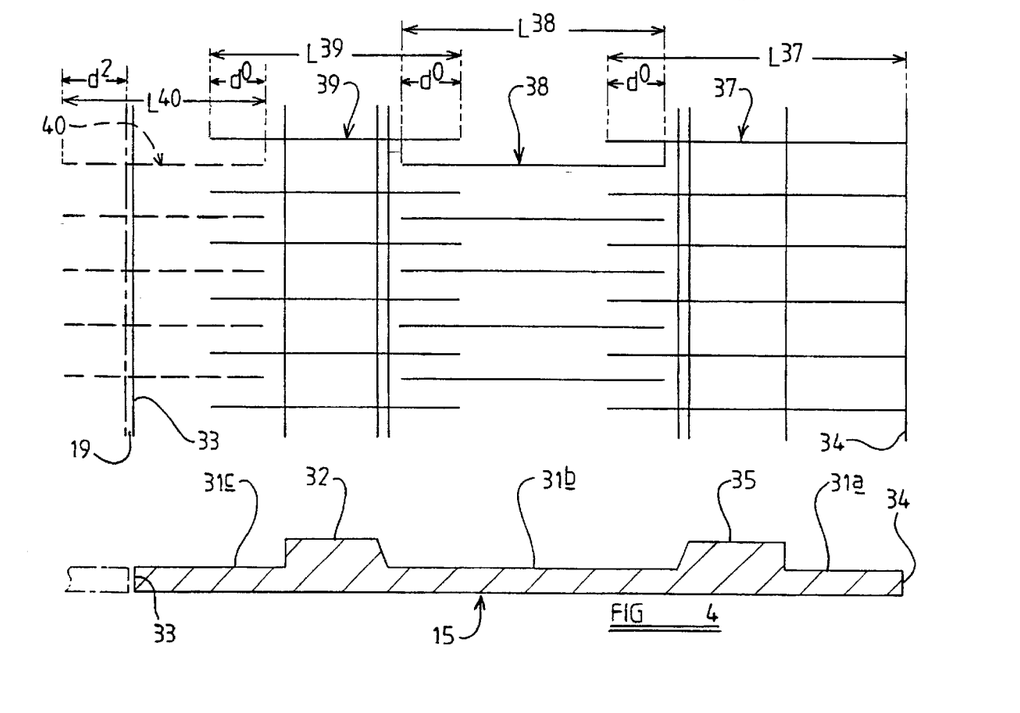
FIG. 4 shows, in a manner similar to FIG. 3, the required slot pattern in a male connector at the other end of the fabricated tube.

The male coupling 15 similarly includes a body portion 31 which is also of the same nominal diameter and wall thickness as the adjacent tubular element 14, and is formed with a first external flange 32 at a position spaced from the end 33 at which it is welded to the adjacent tubular element 14, and a second external flange 35 spaced from the opposite end 34 The flanges 32 and 35 divide the body portion 31 into outer, middle and inner sections 31a, 31b and 31c respectively. Adjacent the end 34 the male coupling 15 is formed with external circumferentially extending serrations (not shown) which are adapted to mate with the internal serrations of a female coupling 11 when two such tubes 10 are joined together. A plurality of circumferentially spaced recesses 36 are formed in the outer end 34 and arrange to receive the locking plungers previously mentioned so as to prevent relative rotation of two tubes 10 when joined together.

Figure 5:
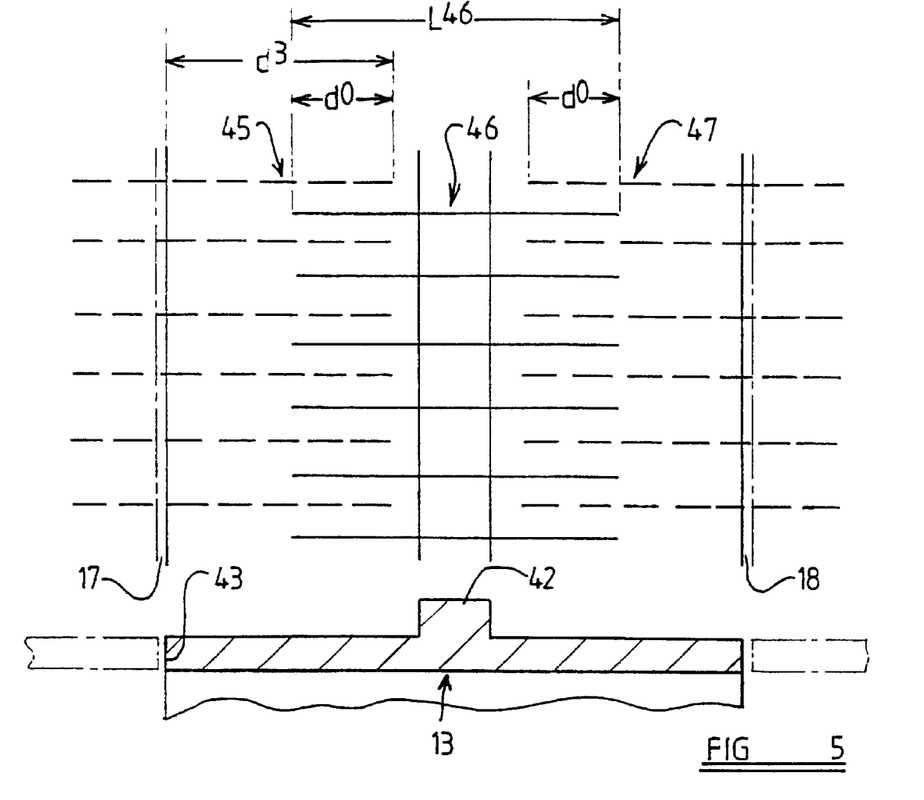
FIG. 5 shows, in a manner similar to FIG. 3, the required slot pattern in a landing ring inserted at a position intermediate the ends of the tube.

The landing ring 13 comprises a cylindrical body 41 having an external flange 42 at a position intermediate the ends 43, 44 whereby it is welded to the adjacent tubular elements 12 and 14 respectively. The flange 42 divides the body 41 into first and second portions 41a and 41b respectively.

Figure 2:
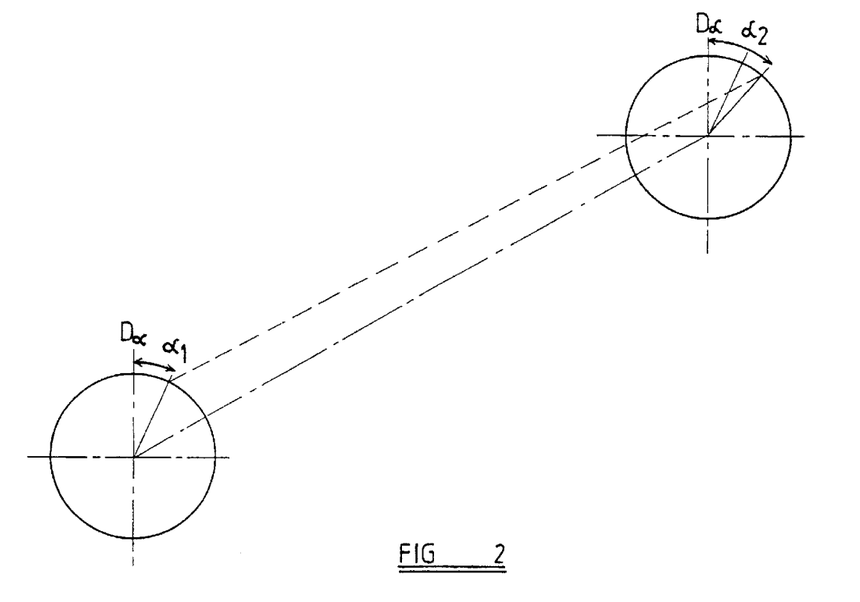
FIG. 2 is a diagrammatic illustration of the way in which the male and female couplings at opposite ends of the tube may be angularly offset relative to one another.

FIG. 2 is a diagrammatic illustration of the way in which the male and female couplings at opposite ends of the tube 12 may be angularly offset relative to one another as a result of distortions and/or inaccuracies in the welding of the various components during the fabrication of the tube. Thus, a specific locking plunger in the female coupling 11 may be angularly offset from an angular datum point $D_\alpha$ by an angle $\alpha_1$ which differs, positively or negatively, from the angle $\alpha_2$ at which the corresponding recess 36 is offset from the datum $D_\alpha$ at the male coupling end of the tube.

To enable the entire tube 10 to be expanded uniformly throughout its length a series of longitudinally extending overlapping slots requires to be cut through the entire wall thickness of the tube throughout its entire length.

In cutting the required pattern of slots, account has to be taken of variations arising from the fact that the tubular elements 12 and 14 may not be truly straight or circular in section and may not be cut to precisely controlled lengths, the fact that there may be variations in the dimensional layout of each joint as a result of manufacturing tolerances in the extrusion of the tubular elements and in the butt welding operations, the fact that slot widths need to be maintained constant despite potentially differing wall thicknesses at different points along the length of the tube, and the fact that there may be angular mis-alignment between the opposite ends of the tube.

Because the overall length L of the female connector 11, which is made by a machining operation, is known to a high degree of accuracy, the required slot pattern as shown in FIG. 3 is essentially pre-determined by the dimensions of this component.

In the example illustrated in FIG. 3, the female connector 11 is formed with three rows of overlapping slots 27, 28, 29. The slots 27 are required to extend from the outer end 24, across the widened end portion 25 and into the outer section 21a; the slots 28 are required to extend wholly within the outer section 21a; and the slots 29 are required to extend from the outer section 21a, across the flange 22 and into the inner section 21b of the body portion 21. To achieve uniform expansion despite the varying geometry of the component, it is required that the slots overlap uniformly by a distance $\underline{d}^0$ and that the slots 29 are longitudinally centred on the flange 22. Because the dimensions of the female coupling 11 are accurately controlled during manufacture, the lengths $L^{27}$, $L^{28}$ and $L^{29}$ of the slots 27,28 and 29 respectively, and their circumferential spacing can be regarded as essentially predetermined and invariable for any given coupling and these slots are accordingly positionally fixed. Their overlap $\underline{d}^0$ is also predetermined for any specific nominal length of fabricated tube 10.

The next row of slots 30 which are required to extend across the joint 16 and into the adjacent tubular element 12 may also be of a predetermined length $L^{30}$ and have the same overlap $d^0$ with slots 29. However, since the thickness of the weld 16 cannot be closely controlled, the distance $d^1$ between the end of the tubular element 12 and the ends of the slots 30 is indeterminant.

In a similar manner, the slot pattern required in the male connector 15 includes three rows of overlapping slots 37, 38, 39. The slots 37 are required to extend from the outer end 34, across the outer section 31a and the flange 35 and into the middle section 31b; the slots 38 are required to extend wholly within the middle section 31b; and the slots 39 are required to extend from the middle section 31b, across the flange 32 and into the inner section 31c of the body portion 31. To achieve uniform expansion despite the varying geometry of the component, it is again required that the slots overlap uniformly by a distance $\underline{d}^0$ and that the slots 39 are longitudinally centred on the flange 32. Because the dimensions of the male coupling 15 are accurately controlled during manufacture, the lengths $L^{37}$, $L^{38}$ and $L^{39}$ of the slots 37,38 and 39 respectively, and their circumferential spacing can be regarded as essentially predetermined and invariable for any given coupling and these slots are accordingly positionally fixed. Their overlap $\underline{d}^0$ is also predetermined for any specific nominal length of fabricated tube 10.

The next row of slots 40 which are required to extend across the joint 19 and into the adjacent tubular element 14 may also be of a predetermined length $L^{40}$ and have the same overlap $d^0$ with slots 39. However, since the thickness of the weld 19 cannot be closely controlled, the distance $d^2$ between the end of the tubular element 14 and the ends of the slots 40 is indeterminate The slots 46, to be formed in the landing ring 13, which is likewise a machined component, have a predetermined length $L^{46}$ and must be centred on the flange 42 as illustrated in FIG. 4. The adjacent slots 45 and 47 which extend from the sections 41a and 41b respectively and over the joints 17 and 18 are required to overlap the slots 46 by the predetermined distance $\underline{d}^0$ at each end. However, because of the indeterminate thickness of the welds 16 and 17, if an invariable slot pattern is followed along the length of the tubular element 12 the distance $d^3$ of the ends of the slots 45 from the end 43 of the landing ring 13 will also be indeterminate, with the result that the length of the overlap with slots 46 will be indeterminate.

Thus, in accordance with the invention, the slots which are formed in the tubular element 12, including the joint-crossing slots 30 and 45 and all those between these slots, are not cut to a strictly predetermined pattern, but instead are variable in position and length so as to accommodate the variations which will occur between different tubes 10 of the distance between the end 24 of the female connector 11 and the end 43 of the landing ring 13. In this way, by varying the length of the slots cut in tubular element 12 in accordance with the measured parameters of the tube 10 undergoing cutting, the required constant overlap do between the slots from slots 30 up to and including slots 45 can be maintained. In a similar manner the slots to be formed in the tubular element 14, including slots joint-crossing slots 47 and 40, are likewise of variable length to ensure that the required predetermined overlap $\underline{d}^0$ is maintained throughout the remaining length of the tube 10 despite the variable thickness of the welds 18 and 19.

In addition, because the tubular elements 12,14 may not be accurately round, or indeed of non-varying diameter along their lengths, and because of the possible angular offset between opposite ends of the tube, adjustments are made to the slot pattern in the tubular elements 12,14 to accommodate such variations as are determined to exist in the tube being cut.

These adjustments are achieved in accordance with the invention by determining certain datum points on the tube and re-computing the lengths of the positionally variable slots to ensure the required overlap with each other and with the positionally fixed slots, and monitoring deviations in circularity and centreline along at least the lengths of tubular elements 12,14 and making appropriate compensatory corrections in order to maintain an optimum pattern of slots for the purpose of achieving uniform expansion.

As shown in FIGS. 5 to 9, the machine 50 in accordance with the invention for cutting the required pattern of slots in the tube 10 includes a pair of parallel steel frames 51 each carrying a precision rail and defining a longitudinal axis for the movement of a main carriage 53 over the entire length of the tube 10 which is supported along its length on variable height roller assemblies 52 which are fitted to pneumatic cylinders so that they can be pulled down individually as the main carriage 53 travels along the length of the tube 10. For this purpose, the main carriage 53 carries an electric motor which drives a pinion meshing with a rack adjacent to one of the rails.

Figure 8:
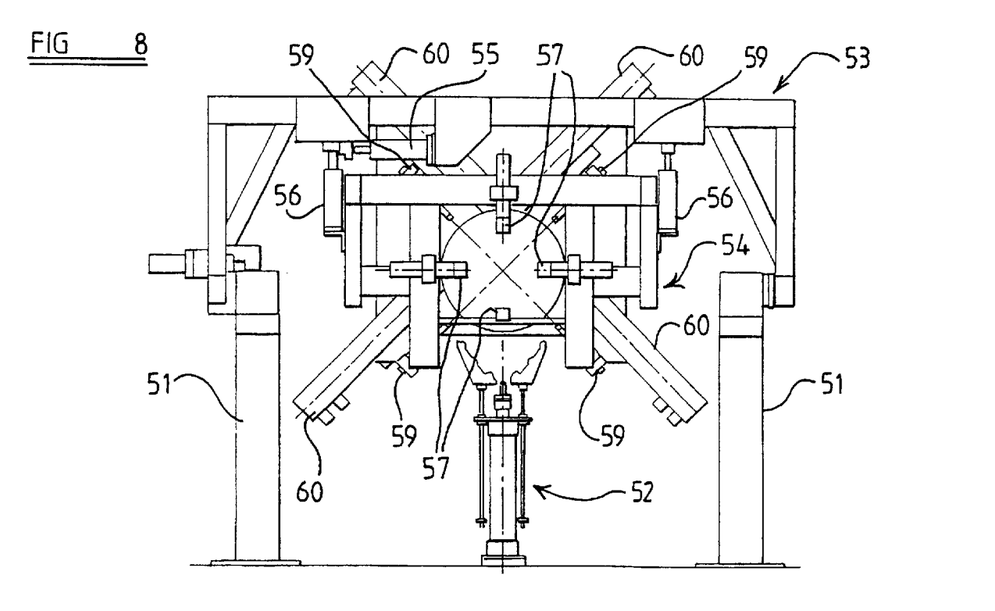
FIG. 8 is view of a carriage assembly in the same direction as that of FIG. 7.
Figure 10:
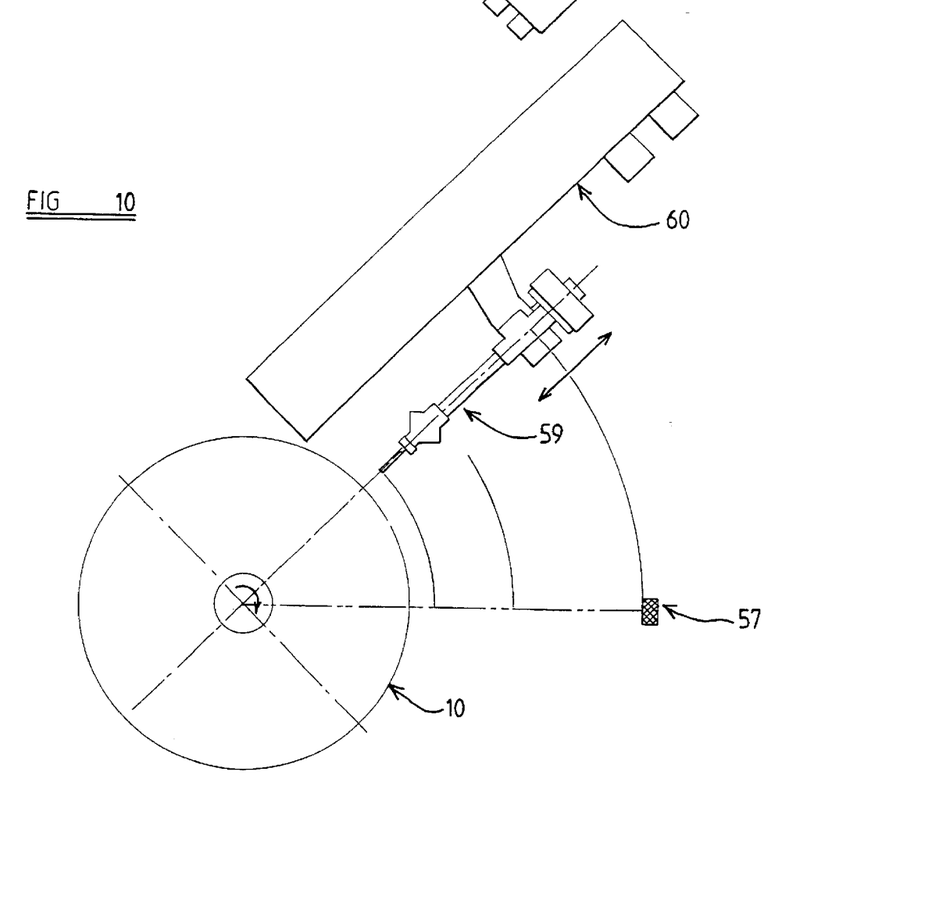
FIG. 10 illustrates the arrangement of one of several probes incorporated in the machine.

The main carriage 53 supports a sub-carriage 54 in such a way that it is self-centring with respect to tube 10. For this purpose the sub-carriage 54 is movable transversely relative to the main carriage by means of an actuator 55, and vertically by means of actuators 56. The sub-carriage 54 carries four probes 57 arranged respectively above, below and on each side of the longitudinal centreline of the tube. The probes may include feelers which have mechanical contact with the external surface of the tube, but preferably are of a contactless type, in particular a laser probe which determines the spacing between the probe and the surface of tube. Data from these probes is used to control the actuators 55 and 56 so that the carriage can be centred onto the tube 10 prior to the commencement of the cutting of each row of slots.

The sub-carriage 54 is also movable relative to the main carriage in a direction longitudinally of the tube by means of a high precision ballscrew (not shown).

Figure 9:
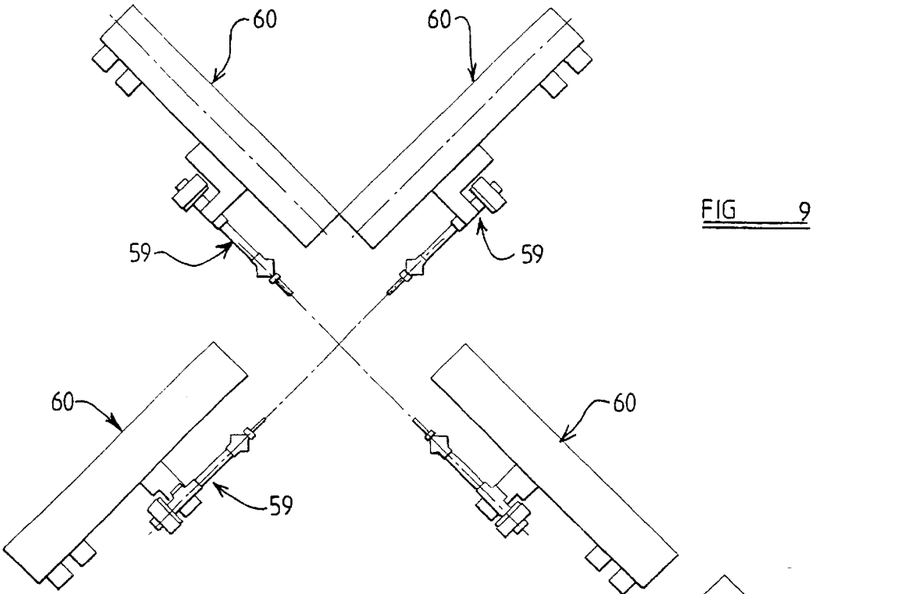
FIG. 9 illustrates in more detail the arrangement of cutter jets incorporated in the machine.

The sub-carriage 54 also carries four water-jet cutters 59 mounted concentrically around the tube centreline at 45° to the vertical so as to surround the tube. The cutters are individually movable towards and away from the tube by means of respective actuators 60 which are controlled in accordance with data from the probes 57 so that the ride height of the cutter jets 59 is continuously adjusted in accordance with the contour of the tube 10.

Figure 6:
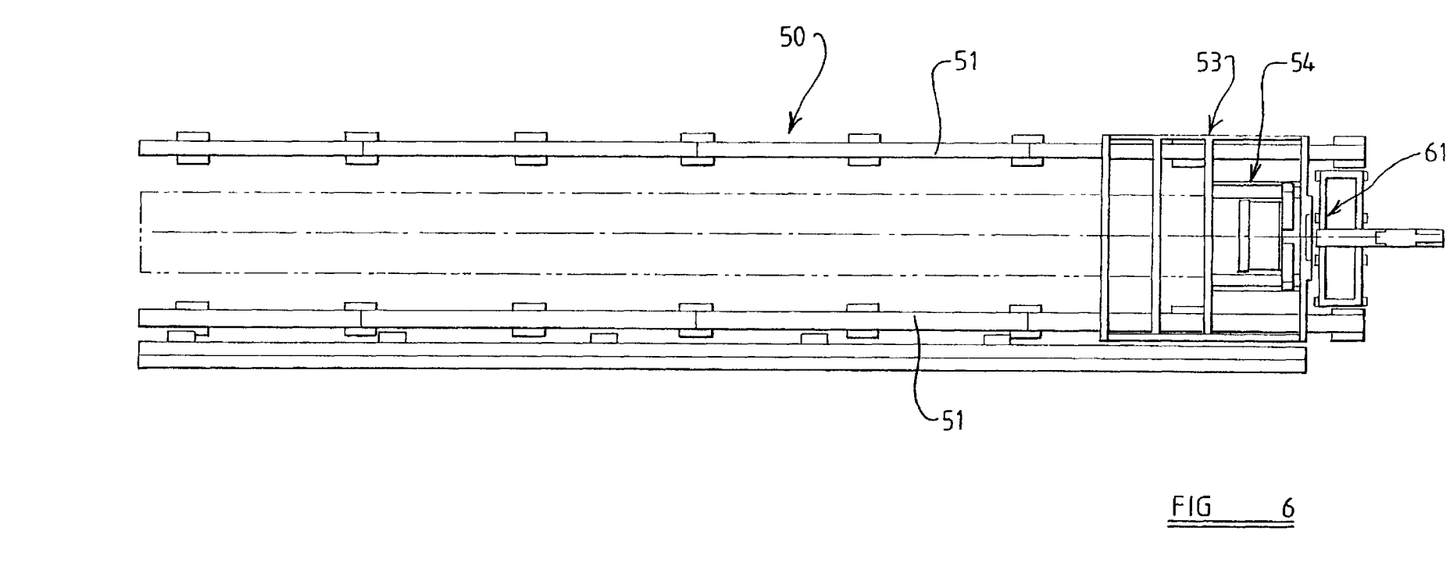
FIG. 6 is a plan view of a machine in accordance with the invention for cutting the required slots in the tube shown in FIG. 1.
Figure 7:
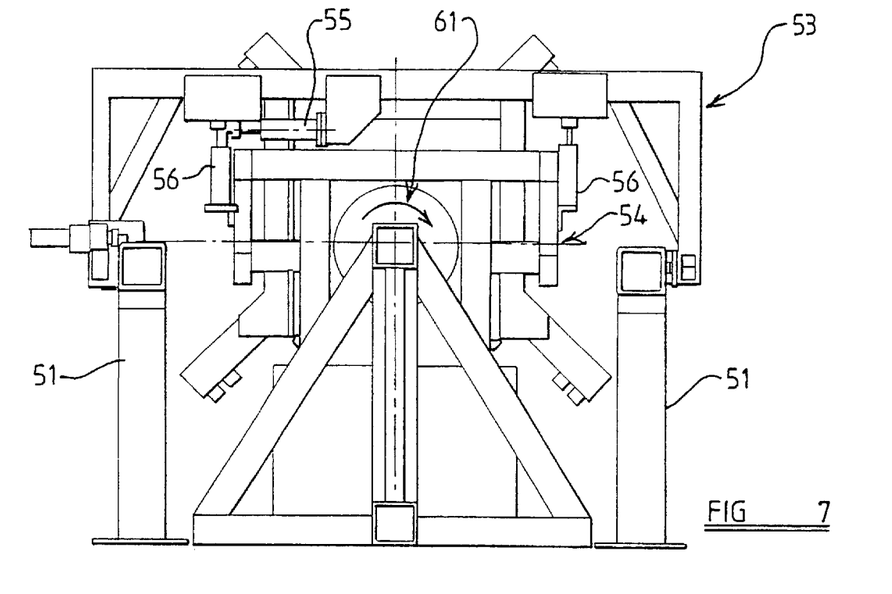
FIG. 7 is an end view of the machine.

At one end, the machine 50 includes a rotatable head 61 which is capable of releasable connection to the adjacent end of tube 10 in such a manner that the tube can be rotated about its longitudinal axis.

In use, the tube 10 is positioned on the supports 52 and coupled to the rotatable head 61. The sub-carriage 54 is set to a "zero" position longitudinally of the main carriage 53 and the main carriage itself is positioned at the end of the machine adjacent to the rotatable head 61. The datum points of the tube 10 in place are then established. This is achieved by firstly operating the rotatable head 61 to align one of the locking plunger holes 26 with the angular datum position $D_\alpha$. The main carriage 53 is then advanced along the rails to bring the cutter jets 59 accurately into line with the end 24 of the tube and establish datum point $D_1$. The main carriage 53 is then moved until the cutter jets are advanced to the centre of the butt weld 16 to define datum point $D_2$, advanced to align the cutter jets with the side face of the flange 42 nearest the end 24 of the tube to establish datum point $D_3$, advanced further to bring the cutter jets to the centre of the butt weld 19 and establish datum point $D_4$, and finally to bring the cutter jets into register with the opposite end 34 of the tube 10 to establish datum $D_5$. The rotation head 61 is then operated to bring the nearest of the recesses 36 to the angular datum point $D_\alpha$ and thereby establish any angular offset between the two ends of the tube.

From the established datum values, and the parameters of the positionally fixed slots which are predetermined by the known sizes of the machined components 11,13 and 15, the required slot pattern for the tubular elements 12 and 14 is computed and cutting is commenced from the end of the machine furthest from the rotatable head 61.

The sequence of cutting operations is as follows. Firstly, the sub-carriage 54 is centred relative to the tube 10, and the cutter jets are set to the required height above the outer surface of the tube. The cutter jets are then brought into operation and the sub-carriage 54 on which they are mounted is then moved longitudinally relative to the main carriage 53 through a distance corresponding to the desired length of the first row of slots. With the main carriage 53 remaining in the same position, the sub-carriage 54 is returned to its starting point, whilst the cutting jets are inoperative, and the rotatable head 61 is moved through the required angular distance so that the points at which the next four slots are to be cut then register with the cutter jets. This operation is repeated, four times in the case of the illustrated embodiment, until a complete ring of slots is formed, whereupon the main carriage 53 is advanced by the distance necessary to bring the cutter jets to the position at which the next ring of slots is to be cut, with the defined overlap $\underline{d}^0$, and the cutting sequence is repeated in this way throughout the whole length of the tube 10. At the beginning of each cutting cycle readings from the probes 54 are used to detect deviations in the longitudinal centreline of the tube from the ideal straight line axis, and any deviations in the shape of the exterior surface of the tubular elements from the ideal true circle. This data is used to adjust the parameters of the positionally variable slots in real-time as the cutter jets are advanced. The cutter jets themselves are also moved automatically in the radial direction so as to maintain the optimum spacing from the external surface of the tube at all points along its length.

In this way, the desired value of overlap $\underline{d}^0$ is achieved despite variations in the overall length of one tube as compared with another due to the tolerances on the butt welds, and additionally, the angular spacing of the slots is varied as necessary within, and between, each ring of positionally variable slots in order to compensate for local deviations of the longitudinal axis of the tube and/or circularity.

What is claimed is:

1. A method of manufacturing an expandable slotted tube of a kind which is fabricated from at least one tubular element and at least two annular elements connected to the opposite ends of the tubular element, wherein axially extending slots are formed at a uniform angular spacing around the periphery of the tube fabricated from said elements and in longitudinally overlapping relation throughout the length of said fabricated tube, including said tubular element and said annular elements, the method being characterized by:

cutting in said annular elements a pattern of overlapping slots in accordance with parameters which are pre-determined relative to the dimensions of said annular elements;

determining for said tubular element a pattern of slots in accordance with measured parameters of the fabricated tube so as to achieve a desired overlap between said slots in said annular elements and said slots in said tubular element, wherein determining for said tubular element a pattern of slots comprises:

establishing longitudinal datum points for each of said annular elements; and calculating, by reference to said longitudinal datum points and by reference to the pre-determined parameters of longitudinal position and axial length of said slots of said annular elements, the nominal longitudinal position and axial length of said slots of said tubular element so as to ensure that slots extending across a joint between said annular elements and said tubular element are longitudinally centered on the joint, and the length of each overlap between said slots of said tubular element, including said joint-crossing slots, is uniform;

cutting said determined pattern of slots in said tubular element;

monitoring at a cutting site a position of the local centre-line of the tube and a radial distance from said centre-line to an outer surface of the tube; and recalculating the nominal parameters of the slots of the tubular element so as to substantially compensate for any local deviations along the length of the tubular element the position of the centre-line or in the outer surface of the tubular element.

2. An apparatus for forming an expandable slotted tube of a kind which is fabricated from at least one tubular element and at least two annular elements connected to the opposite ends of the tubular element, wherein axially extending slots are formed at a uniform angular spacing around the periphery of the tube fabricated from said elements and in longitudinally overlapping relation throughout the entire length thereof, including said tubular element and said annular elements, comprising:

means for establishing longitudinal datum points for each of said annular elements;

means for calculating, by reference to said longitudinal datum points and to pre-determined parameters of a pattern of slots to be formed in said annular elements, the nominal longitudinal position and axial length of a pattern of slots to be cut in said tubular element so as to ensure that those slots extending across a joint between said annular elements and said tubular element are longitudinally centred on the joint, and the length of each overlap between said slots of said tubular element, including said joint-crossing slots, is uniform;

means for cutting said slots in said tubular element and said annular elements; and means for monitoring the position of the local centre-line of the tube and the radial distance of the outer surface of the tube at the cutting site from said centre-line, and recalculating the nominal parameters of the slots of said tubular element so as to correct substantially uniformly over the length of the tubular element for any local deviations in the position of the centre-line and/or in circularity of the tubular element as the cutting progresses along the tubular element.

* * * * *